US011299131B2

(12) United States Patent
Kim

(10) Patent No.: US 11,299,131 B2
(45) Date of Patent: Apr. 12, 2022

(54) WIPER BLADE ASSEMBLING ADAPTER, WIPER BLADE ASSEMBLY, AND WIPER APPARATUS

(71) Applicant: CAP CORPORATION, Gyeongsangbuk-Do (KR)

(72) Inventor: Yun Soo Kim, Gyeongsangbuk-do (KR)

(73) Assignee: CAP CORPORATION, Gyeongsangbuk-Do (KR)

( * ) Notice: Subject to any disclaimer, the term of this patent is extended or adjusted under 35 U.S.C. 154(b) by 0 days.

(21) Appl. No.: 17/023,739

(22) Filed: Sep. 17, 2020

(65) Prior Publication Data

US 2021/0107433 A1 Apr. 15, 2021

(30) Foreign Application Priority Data

Oct. 14, 2019 (KR) ........................ 10-2019-0127205

(51) Int. Cl.
*B60S 1/40* (2006.01)

(52) U.S. Cl.
CPC ............... *B60S 1/4048* (2013.01); *B60S 1/40* (2013.01); *B60S 2001/4051* (2013.01); *B60S 2001/4058* (2013.01)

(58) Field of Classification Search
CPC ........ B60S 1/40; B60S 1/4048; B60S 1/4045; B60S 2001/4058; B60S 2001/4061; B60S 2001/4051; B60S 2001/4022; B60S 2001/4035
USPC ...................................................... 15/250.32
See application file for complete search history.

(56) References Cited

U.S. PATENT DOCUMENTS 9,073,520 B2 7/2015 Ozer et al.
9,302,652 B2 4/2016 Depondt
10,093,282 B2 * 10/2018 Hyun .................... B60S 1/4016
2012/0144615 A1 * 6/2012 Song .................... B60S 1/4003 15/250.32
2012/0233802 A1 9/2012 Depondt
2014/0041143 A1 2/2014 Kim et al.
2014/0338144 A1 11/2014 An et al.
2016/0375865 A1 12/2016 Aliberti et al.
2016/0375874 A1 12/2016 Aliberti et al.
(Continued)

FOREIGN PATENT DOCUMENTS

EP 3437941 A1 2/2019
EP 3339114 B1 9/2019
(Continued)

OTHER PUBLICATIONS

Machine translation of Korean publication 10-1211096, published Dec. 2012. (Year: 2012).*
(Continued)

*Primary Examiner* — Gary K. Graham
(74) *Attorney, Agent, or Firm* — IP & T Group LLP

(57) ABSTRACT

The present invention relates to a wiper blade assembling adapter, a wiper blade assembly, and a wiper apparatus. There is provided a wiper blade assembling adapter for coupling a wiper blade to a wiper arm, which has a distal end at which a plurality of coupling elements facing each other protrude inward from each side surface surrounding the adapter, the wiper blade assembling adapter including a main body part coupled to the wiper blade and a locking part rotatably provided in the main body part.

12 Claims, 7 Drawing Sheets

(56) References Cited

U.S. PATENT DOCUMENTS

| | | | | |
|---|---|---|---|---|
| 2019/0031151 | A1* | 1/2019 | Moneyron | B60S 1/4048 |
| 2019/0031152 | A1 | 1/2019 | Moneyron et al. | |
| 2019/0118777 | A1 | 4/2019 | Poton et al. | |
| 2019/0118779 | A1 | 4/2019 | Poton et al. | |
| 2021/0107434 | A1 | 4/2021 | Kim | |

FOREIGN PATENT DOCUMENTS

| | | | |
|---|---|---|---|
| KR | 10-2012-0092570 | A | 8/2012 |
| KR | 10-1198352 | B1 | 11/2012 |
| KR | 10-1211096 | * | 12/2012 |
| KR | 10-1879694 | B1 | 7/2018 |

OTHER PUBLICATIONS

Office Action issued by the Korea Intellectual Property Office dated Dec. 14, 2020.

Extended European Search Report dated Feb. 26, 2021 for the European Patent Application No. 20196106.7.

* cited by examiner 1
10
11
12
121
122
20
21
22
24
30
32

1
10
11
12
121
1211a
1211b
122
123
1231
20
21
22
23
231
232
24
30
31
311
3111
312
315a
315b
316
3161
317
32
321
3211
322
3221

WIPER BLADE ASSEMBLING ADAPTER, WIPER BLADE ASSEMBLY, AND WIPER APPARATUS

CROSS-REFERENCE TO RELATED APPLICATION

This application claims priority to and the benefit of Korean Patent Application No. 10-2019-0127205, filed on Oct. 14, 2019, the disclosure of which is incorporated herein by reference in its entirety.

BACKGROUND

1. Field of the Invention

The present invention relates to a wiper blade assembling adapter, a wiper blade assembly, and a wiper apparatus, and more particularly, to a wiper blade assembling adapter, a wiper blade assembly, and a wiper apparatus capable of facilitating separation from a wiper arm and guaranteeing a firm fastening force to wiper arm.

2. Discussion of Related Art

Generally, a wiper apparatus is installed on a vehicle or the like to wipe off a surface of a windshield. The wiper apparatus includes a wiper motor, a wiper arm, a wiper blade, and the like, and an adapter may be used for structural connection between the wiper arm and the wiper blade.

The wiper arm is connected to a rotating shaft of the wiper motor at a proximal end and reciprocates by the wiper motor. One or more wiper arms may be provided according to the size of the windshield. In a case in which a plurality of wiper arms are provided, the wiper arms are disposed such that rotations thereof do not interfere with each other.

Also, the wiper blade is separably coupled to an end of the wiper arm through an adapter. While being disposed in the form of a straight line and maintaining a state of being in close contact with the windshield, the wiper blade slides and wipes off a surface of the windshield by movement of the wiper arm that rotates.

In a state in which the wiper blade is installed on the vehicle, the wiper blade continuously rubs against the windshield. Thus, as the period of use elapses, the wiper blade may wear out or generate unnecessary noise, or the performance of the wiper blade wiping off the surface may deteriorate.

Therefore, regular replacement is required for the wiper blade. Here, a user of the vehicle separates the existing wiper blade from the wiper arm and then fastens a new wiper blade using the adapter.

However, because the wiper arm has various shapes according to the type, an adapter having a form suitable for the wiper arm is required. Also, the adapter should facilitate replacement of the wiper blade and allow the wiper blade, which is fastened to the wiper arm, to stably maintain the state of being in close contact with the windshield despite wind resistance or the like.

Therefore, in consideration of the shape of the wiper arm, many developments have been made on the structure of the adapter that effectively connects the wiper blade to the wiper arm.

SUMMARY OF THE INVENTION

The present invention is directed to providing a wiper blade assembling adapter, a wiper blade assembly, and a wiper apparatus capable of stably maintaining seating of a wiper using a locking part that rotates, thereby guaranteeing a degree of close contact with a windshield and making it very convenient to replace the wiper.

According to an aspect of the present invention, there is provided a wiper blade assembling adapter for coupling a wiper blade to a wiper arm, which has a distal end at which a plurality of coupling elements facing each other protrude inward from each side surface surrounding the adapter, the wiper blade assembling adapter including a main body part coupled to the wiper blade and a locking part rotatably provided in the main body part, wherein the main body part includes a plurality of guide parts, which each have an insertion part into which the coupling element of the wiper arm is inserted in a first direction and a catching part which extends from a distal end of the insertion part in a direction different from the insertion part and which is configured to block movement of the coupling element in the first direction after the coupling element moves in a second direction, and a hinge part disposed at one side of the guide part, and the locking part has a rotary surface which is rotatably coupled to the hinge part and a cover surface which extends from the rotary surface and covers an outer surface of the wiper arm that surrounds the main body part.

Specifically, the plurality of coupling elements of the wiper arm may protrude inward at different heights, and the plurality of guide parts may be provided such that heights of the catching parts are different.

Specifically, in the guide part, the insertion part and the catching part may be connected to form an L-shape.

Specifically, the guide part may have a first guide part adjacent to the hinge part and a second guide part disposed opposite the hinge part with respect to the first guide part.

Specifically, the main body part may further include a step part provided at an outer surface facing the wiper arm.

Specifically, the step part may have a shape that is continuous with the insertion part of the first guide part.

Specifically, a rotation limiting element may protrude from one side of the hinge part, and the locking part may change between an unlocking state, in which a lower end of the cover surface is disposed below the rotation limiting element and causes the outer surface of the main body part to be exposed, and a locking state, in which the rotary surface rotates and the lower end of the cover surface moves over the rotation limiting element and covers the outer surface of the main body part.

Specifically, the cover surface may have a cover element that extends from a distal end toward the guide part, and the cover element may cover at least the insertion part of the first guide part in the locking state.

Specifically, the hinge part may be provided as a pair of hinge parts at both sides of one surface of the main body part, each hinge part may be provided in the form of a free end that is deformable so that distal ends of the hinge parts are able to come close to each other, and an elastic bar configured to connect the pair of hinge parts to each other may be provided to maintain a gap between the hinge parts.

According to an aspect of the present invention, there is provided a wiper blade assembly including a wiper blade which has a close contact member configured to come in close contact with a surface of a target of close contact, and an adapter which is fastened to the wiper blade and to and from which a wiper arm is attached and detached, wherein the adapter includes a main body part coupled to the wiper blade and a locking part rotatably provided in the main body part, the main body part includes an insertion part into which a coupling element, which protrudes from a side surface of the wiper arm that surrounds a side surface of the main body part, is inserted and a catching part configured to catch the coupling element seated thereon after passing through the insertion part, and the locking part has a rotary surface which is rotatably connected to the main body part and a cover surface which covers an outer surface of the wiper arm that covers an outer surface of the main body part.

Specifically, the wiper blade may further include an elastic member configured to provide an elastic force to the close contact member in a direction in which close contact with the close contact member occurs, and a cover member configured to cover the elastic member.

Specifically, the wiper blade may further include a coupling cover provided at a center and to which the adapter is coupled, a coupling hole in a cylindrical shape whose one side is open may be provided in any one of the main body part and the coupling cover, and a bar-shaped seating element configured to be forcibly fitted to the coupling hole may be provided at the other one of the main body part and the coupling cover.

Specifically, the seating element may be fastened to the coupling hole and serve as a hinge shaft so that the wiper arm and the wiper blade rotate relative to each other.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
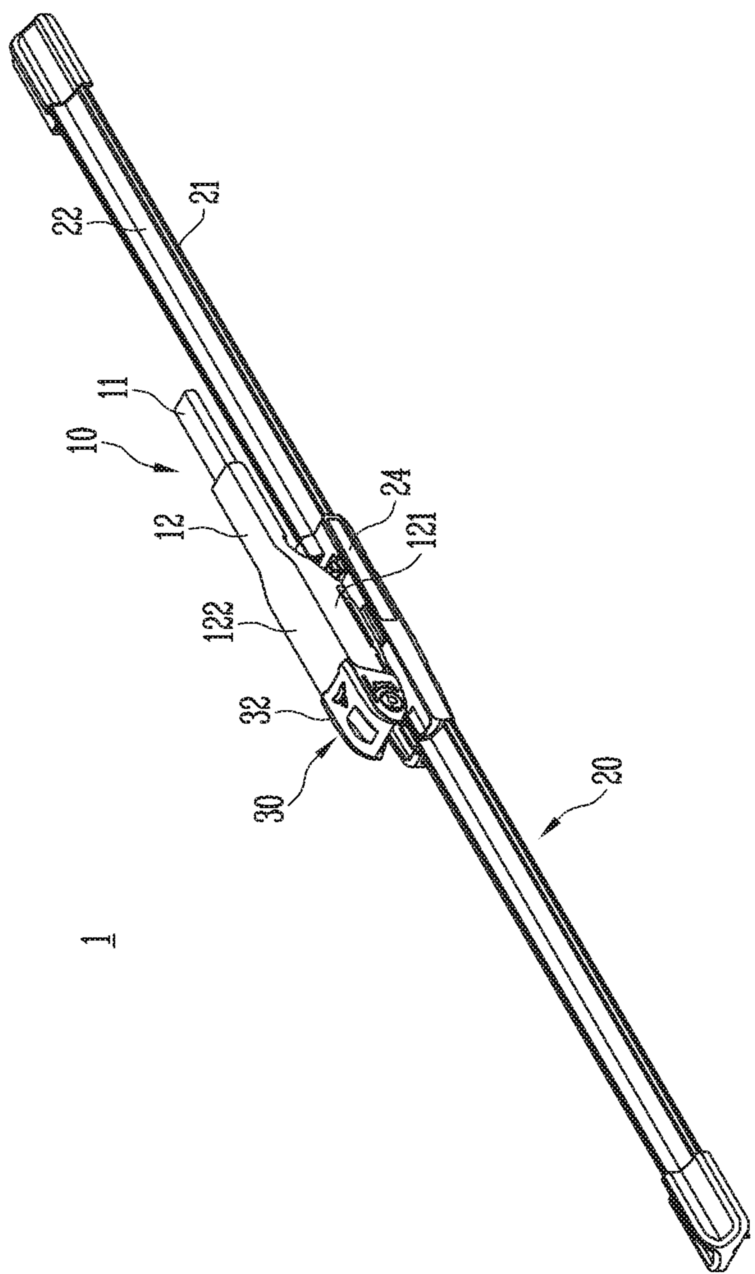
FIG. 1 is a perspective view of a wiper apparatus according to an embodiment of the present invention.

The objectives, specific advantages, and novel features of the present invention will become more apparent from the detailed description and the preferred embodiments below to be referenced to the accompanying drawings. In giving reference numerals to elements in each drawing of this specification, it should be noted that like reference numerals are given to like elements as much as possible even when the elements are illustrated in different drawings. In addition, in describing the present invention, when detailed description on a known related art is deemed to unnecessarily obscure the gist of the present invention, the detailed description thereof will be omitted.

Also, for reference, note that small differences that may exist between the drawings included herein may be interpreted as constituting different embodiments included in the present invention.

Figure 2:
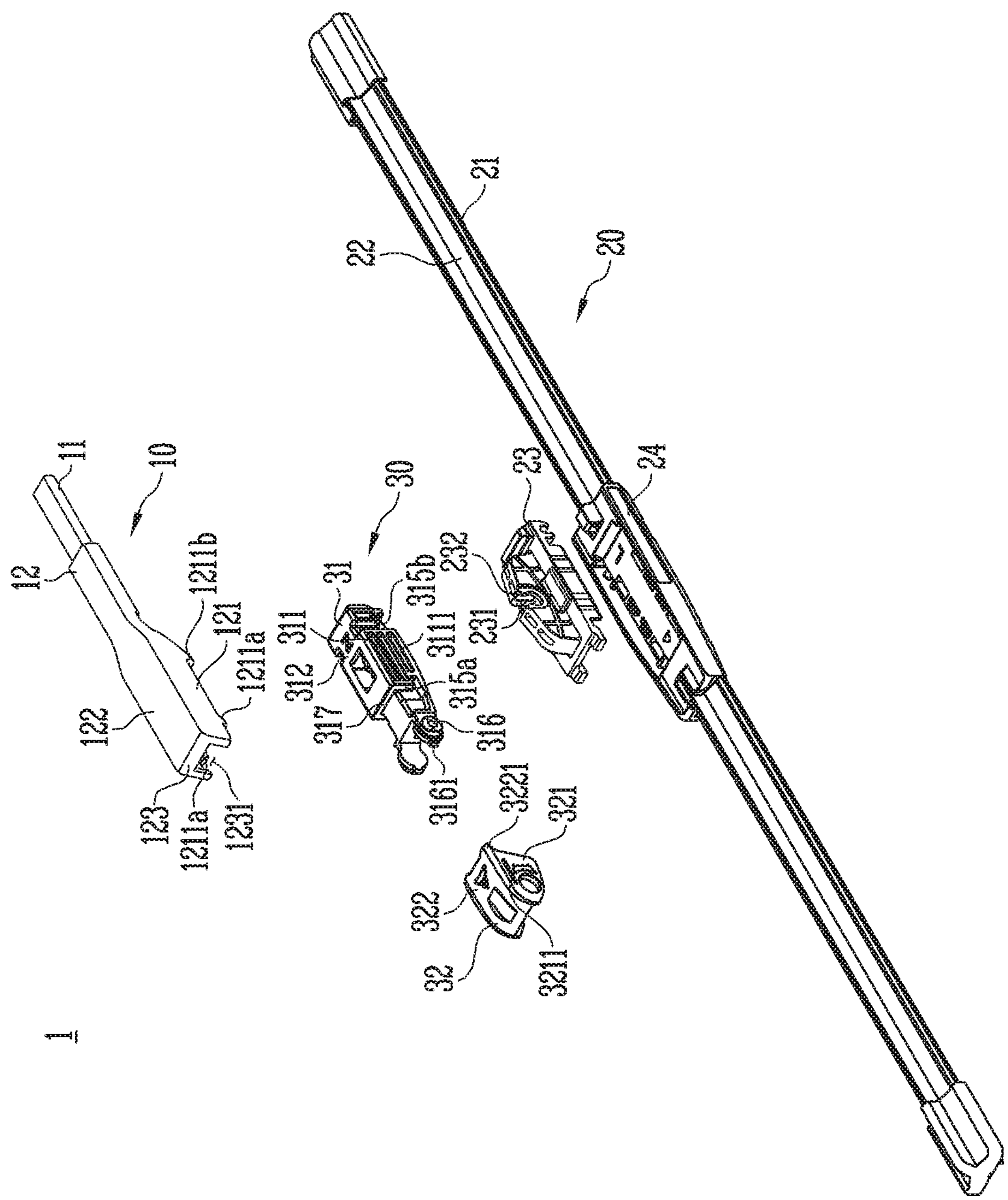
FIGS. 2 and 3 are exploded perspective views of the wiper apparatus according to an embodiment of the present invention.
Figure 3:
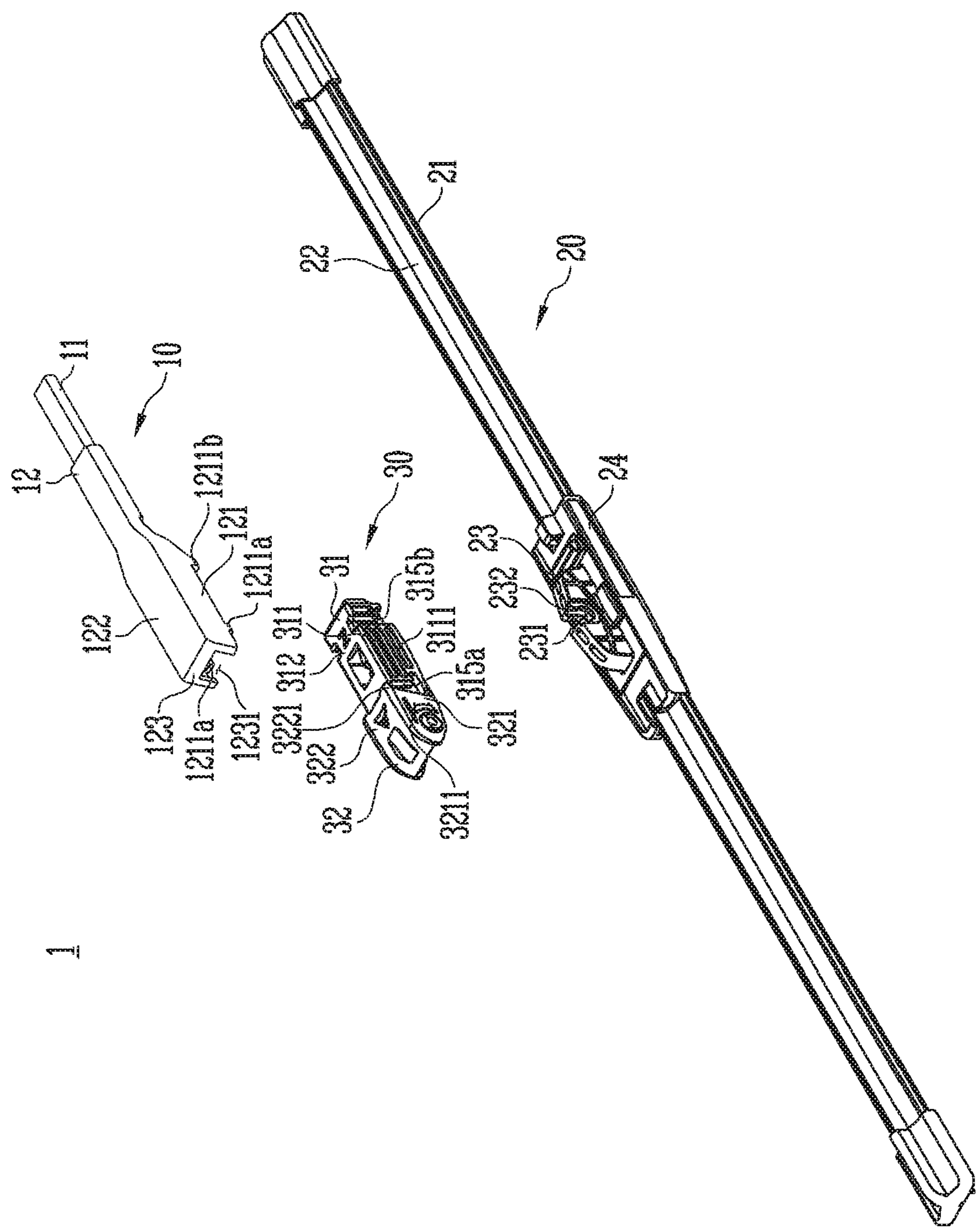
Figure 4:
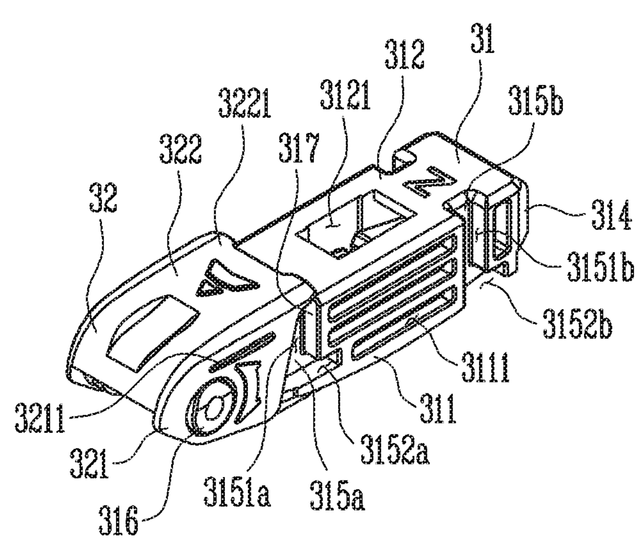
FIG. 4 is a perspective view of a wiper blade assembling adapter according to an embodiment of the present invention.
Figure 5:
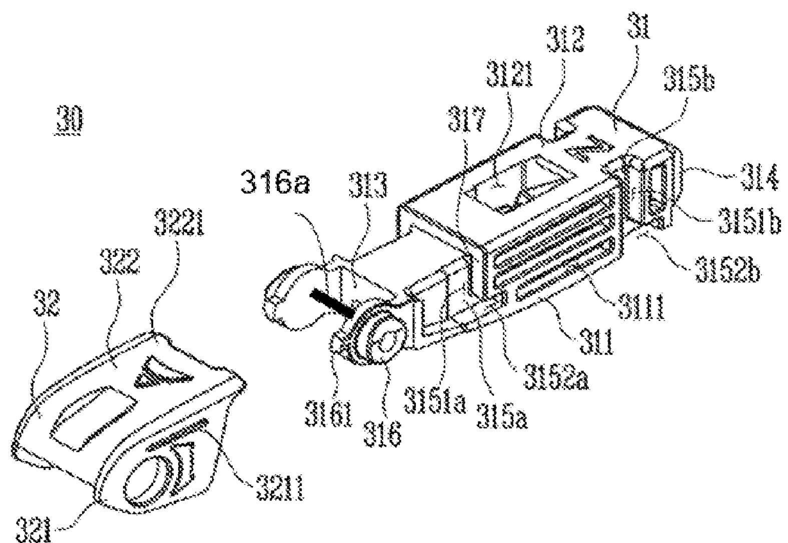
FIG. 5 is an exploded perspective view of the wiper blade assembling adapter according to an embodiment of the present invention.

FIG. 1 is a perspective view of a wiper apparatus according to an embodiment of the present invention, and FIGS. 2 and 3 are exploded perspective views of the wiper apparatus according to an embodiment of the present invention;

FIG. 4 is a perspective view of a wiper blade assembling adapter according to an embodiment of the present invention, and FIG. 5 is an exploded perspective view of the wiper blade assembling adapter according to an embodiment of the present invention.

Figure 6:
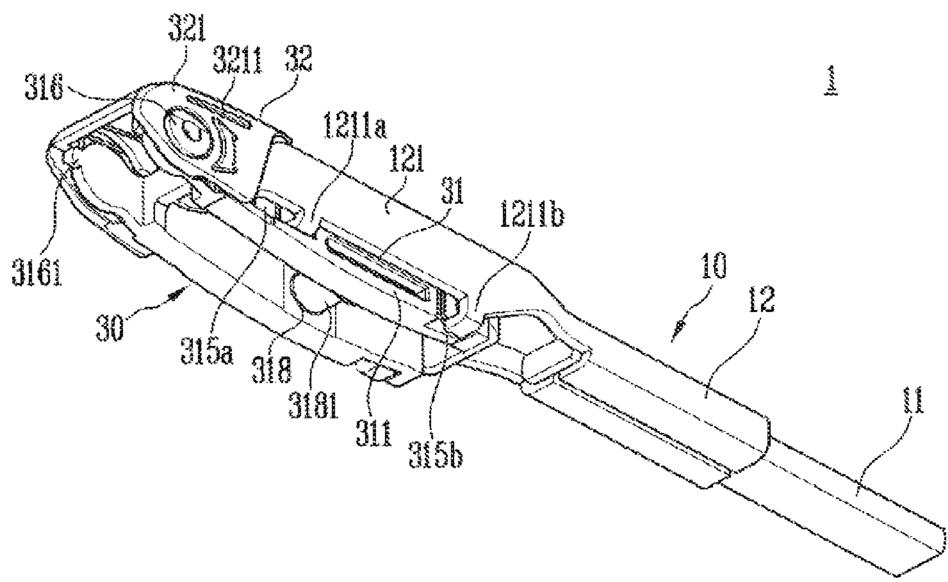
FIG. 6 is a perspective view of a wiper blade assembly according to an embodiment of the present invention.
Figure 7:
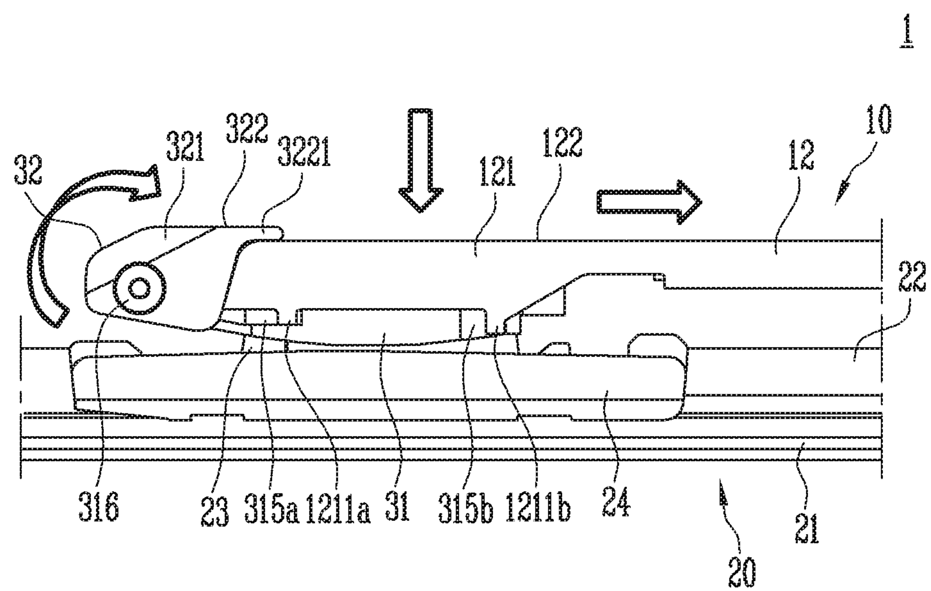
FIGS. 7 to 8C are views for describing assembly of the wiper apparatus according to an embodiment of the present invention.
Figure 8A:
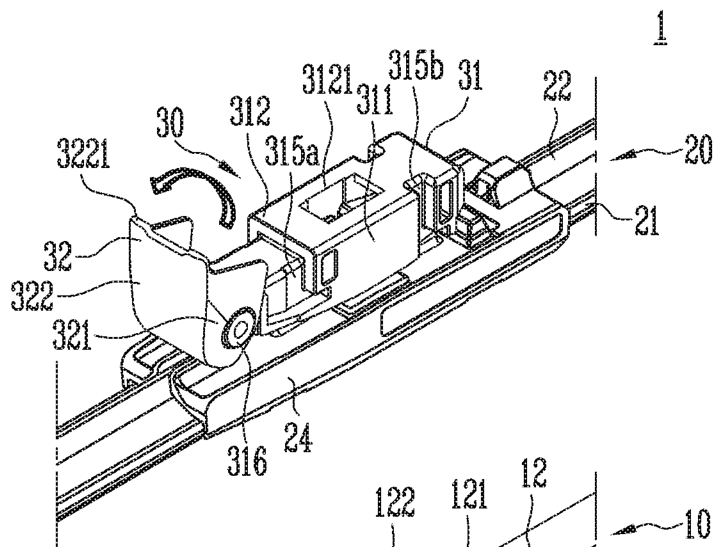
Figure 8B:
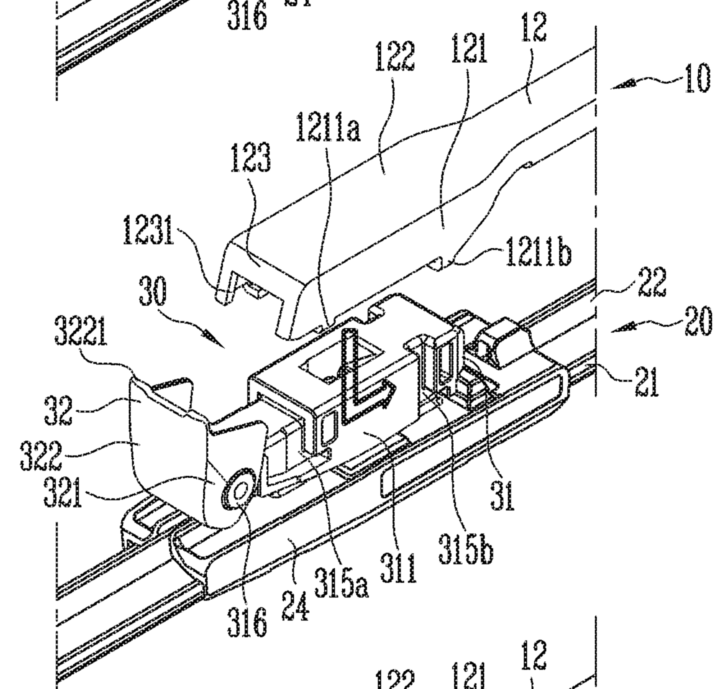
Figure 8C:
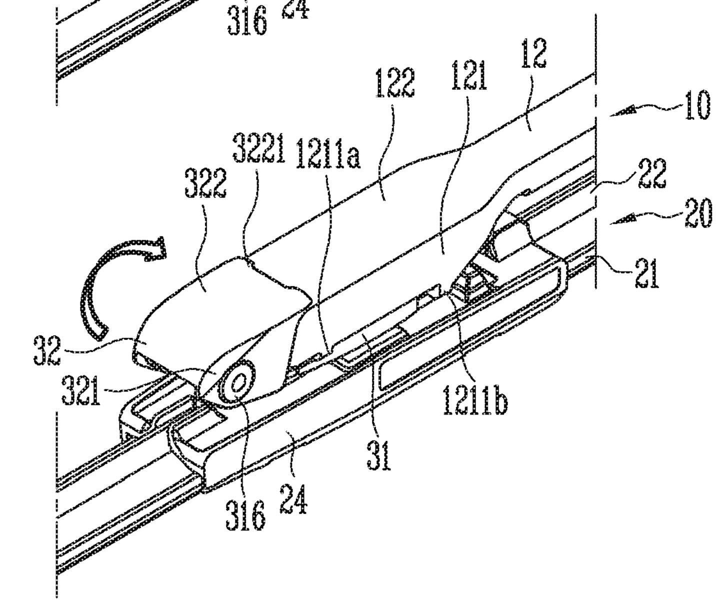

Also, FIG. 6 is a perspective view of a wiper blade assembly according to an embodiment of the present invention, and FIGS. 7 and 8 are views for describing assembly of the wiper apparatus according to an embodiment of the present invention.

Referring to FIGS. 1 to 8, a wiper apparatus 1 according to an embodiment of the present invention includes a wiper arm 10, a wiper blade 20, and an adapter 30 for assembling the wiper blade 20 (hereinafter referred to as "adapter 30").

For reference, in this specification, an assembly of the wiper blade 20 may refer to a state in which the wiper blade 20 and the adapter 30 are coupled.

Also, hereinafter, an inner surface and an outer surface refer to a direction heading toward a target of close contact and a direction moving away from the target of close contact, respectively, a side surface refers to a surface between the inner surface and the outer surface, and a front surface and a rear surface are surfaces differentiated with a direction moving away from a proximal end of the wiper arm 10 set as the front. However, such expressions are merely terms for aiding in description of the present invention based on the drawings, and thus the right of the present invention is not limited by the terms.

The wiper arm 10 rotates about the proximal end, has a distal end connected to the wiper blade 20, and transmits a rotational force to the wiper blade 20, thereby implementing cleaning of a target of close contact by the wiper blade 20.

The wiper arm 10 has an arm part 11 and a fastening part 12. A driving source (a motor or the like) for rotating the wiper arm 10 is directly or indirectly connected to a proximal end of the arm part 11, and a distal end of the arm part 11 rotates in an arc by a rotational force of the driving source.

The arm part 11 may be formed in the shape of a bar that extends between the proximal end and the distal end. The arm part 11 may be formed of a metal material for durability, but the material of the arm part 11 is not limited thereto. Also, the arm part 11 may have various other shapes as long as the arm part 11 is able to connect the proximal end and the distal end.

The fastening part 12 is provided at the distal end of the arm part 11. As shown in the drawings, the fastening part 12 may be fixedly installed on the arm part 11. For example, the fastening part 12 may have a form in which, as the shape of a portion of the fastening part 12 that faces the distal end of the arm part 11 is deformed to surround the distal end of the arm part 11, the fastening part 12 firmly holds the arm part 11 and is fixed to the arm part 11.

More specifically, the fastening part 12 may include an outer surface 122, which is in an outward direction from a target of close contact, and side surfaces 121, which extend toward the target of close contact from both sides of the outer surface 122. At the portion of the fastening part 12 facing the distal end of the arm part 11, the side surface 121 may be bent or curved inward and hold and fix the distal end of the arm part 11.

Of course, the fastening part 12 may be detachably installed at the distal end of the arm part 11 or may be a portion integrally formed with the arm part 11 and extending from the distal end of the arm part 11.

In the former case, the fastening part 12 may be formed of a material that is the same as or different from a material of the arm part 11. For example, unlike the arm part 11, the fastening part 12 may be formed of a synthetic resin. On the other hand, in the latter case, the fastening part 12 may be formed of a metal material like the arm part 11.

The fastening part 12 is used as a portion for connecting the arm part 11 to the adapter 30, and the wiper arm 10 may be connected to the adapter 30 by the fastening part 12. To this end, the fastening part 12 has a horizontal width larger than that of the arm part 11 and forms a coupling structure for coupling with the adapter 30. However, the horizontal width of the fastening part 12 may be larger at a portion of the fastening part 12 that is fixed to the adapter 30 than at a portion of the fastening part 12 that is fixed to the arm part 11. Changes in the horizontal width of the fastening part 12 may continuously occur throughout the fastening part 12. That is, the horizontal width of the fastening part 12 may smoothly increase in a direction from a portion of the fastening part 12 that is connected to the arm part 11 toward a portion of the fastening part 12 that is connected to the adapter 30.

Also, the fastening part 12 may be provided such that the height of the side surface 121 is the smallest at a portion where the horizontal width changes, and the height of the side surface 121 may increase in a direction toward the portion of the fastening part 12 that is connected to the adapter 30. However, the height of the side surface 121 may be constant between coupling elements 1211*a* and 1211*b* which will be described below.

Since the adapter 30 is coupled to the wiper blade 20, the fastening part 12 serves to allow the wiper arm 10 to be connected to the wiper blade 20 through the adapter 30. This will be described in detail below.

The coupling elements 1211*a* and 1211*b* for coupling with the adapter 30 are provided at the side surfaces 121 of the fastening part 12. The coupling elements 1211*a* and 1211*b* are portions that are bent or curved to protrude inward from lower sides of the side surfaces 121. The coupling elements 1211*a* and 1211*b* may be formed as protrusions.

The coupling elements 1211*a* and 1211*b* of the fastening part 12 may be caught at guide parts 315*a* and 315*b* of the adapter 30, which will be described below, and prevent the wiper arm 10 from being easily separated from the adapter 30. This will be described in detail below.

The plurality of coupling elements 1211*a* and 1211*b* may be provided in a longitudinal direction at each of the side surfaces 121 of the fastening part 12. For example, a first coupling element 1211*a* may be provided at a position on the side surface 121 of the fastening part 12 that is distant from the arm part 11 (adjacent to a front surface 123), and a second coupling element 1211*b* may be provided at a position on the side surface 121 of the fastening part 12 that is adjacent to the arm part 11.

The first coupling element 1211*a* and the second coupling element 1211*b* may be provided to be spaced apart, and a separation distance therebetween is not particularly limited. However, for example, a gap between the coupling elements 1211*a* and 1211*b* provided at a left side surface 121 of the fastening part 12 may be the same as a gap between the coupling elements 1211*a* and 1211*b* provided at a right side surface 121 of the fastening part 12.

Also, the coupling elements 1211*a* and 1211*b* provided at the left side surface 121 of the fastening part 12 and the coupling elements 1211*a* and 1211*b* provided at the right side surface 121 of the fastening part 12 may be provided at positions facing each other. This indicates that the fastening part 12 may be provided to be vertically symmetrical.

The plurality of coupling elements 1211*a* and 1211*b* provided at one side surface 121 of the fastening part 12 may be provided at different heights. For example, the first coupling element 1211*a* adjacent to the front surface 123 of the fastening part 12 may be provided at a higher position than the second coupling element 1211*b* that is distant from the front surface 123 of the fastening part 12.

As mentioned above, the coupling elements 1211*a* and 1211*b* are configurations that are caught at the adapter 30 to maintain coupling between the adapter 30 and the wiper arm 10. According to the present embodiment, the plurality of coupling elements 1211*a* and 1211*b* provided at different heights may be used to form fastening points at a plurality of positions and further suppress separation between the adapter 30 and the wiper arm 10.

The front surface 123 provided at one side of the fastening part 12 that is distant from the proximal end of the arm part 11 may be smoothly connected to the outer surface 122 and form a curved surface. The front surface 123 may be provided as an inclined surface. Here, a locking part 32 of the adapter 30, which will be described below, may have an inclined side corresponding to the front surface 123 and, when the locking part 32 is placed in a locking state in which separation of the wiper arm 10 is not possible, the front surface 123 of the fastening part 12 may be pressed by the locking part 32.

The front surface 123 of the fastening part 12 may have an opening 1231 formed therein and thus have an open form instead of a closed form. That is, the front surface 123 of the fastening part 12 may be provided in an upside-down U-shape, and a hollow space in the center of the front surface 123 may be engaged with a step part 317 of the adapter 30.

The wiper blade 20 comes in close contact with a surface of a target of close contact and cleans the surface of the target of close contact by movement. The target of close contact may be a windshield of a vehicle, but is not limited thereto. The target of close contact may be any other object capable of being cleaned by sliding.

The wiper blade 20 has a close contact member 21 configured to directly come in close contact with the surface of the target of close contact and slide along the surface. The close contact member 21 has a cross-sectional structure that comes in close contact with the surface and makes friction with the surface appropriate to facilitate sliding for cleaning. For example, the close contact member 21 may have a form in which a V-shaped cross-section extends in a longitudinal direction.

That is, the close contact member 21 may be provided in a form in which a contact area with the target of close contact is reduced. For close contact with the surface, the close contact member 21 may be formed of a material such as rubber that has a shock-absorbing force.

In a state in which an external force is not applied to the close contact member 21, a close-contact side of the close contact member 21 may have a different shape from the surface of the target of close contact. However, when the wiper blade 20 is coupled to the wiper arm 10, as the close contact member 21 is pressed toward the target of close contact, the close-contact side may naturally be deformed to a shape that corresponds to the surface of the target of close contact.

The wiper blade 20 may include an elastic member (not illustrated) for applying an elastic force to the close contact member 21. The elastic member may be a member such as a leaf spring.

Due to the elastic member, the close-contact side of the close contact member 21 receives a force that attempts to return the close-contact side to a curved form that is more bent than the surface of the target of close contact. Therefore, the close-contact side, which is pressed by the wiper arm 10 and deformed, applies a force attempting to push the target of close contact but maintains a state of being pressed by the wiper arm 10, thereby being firmly in close contact with the target of close contact.

The elastic member is formed of a material (metal or the like) that is more rigid than the close contact member 21 or a cover member 22, which will be described below. The elastic member may be a configuration for maintaining a long shape of the wiper blade 20.

The cover member 22 may be provided at an outer side of the close contact member 21 (or the elastic member). The cover member 22 may be a configuration for maintaining the form of the wiper blade 20 by being coupled to the close contact member 21, which is easily deformed, via the elastic member.

For example, a long groove may be provided in a center of the elastic member in the longitudinal direction, and the close contact member 21 may have a structure that is fitted to the groove of the elastic member. Also, a groove to which both ends of the elastic member are fitted may be provided inside the cover member 22 in the longitudinal direction, and the elastic member may be fixed to the cover member.

That is, the cover member 22 and the close contact member 21 may be coupled about the elastic member. Of course, various fixing structures may be applied, other than a method of fixing using a groove as described above. The cover member 22 and the close contact member 21 may also be coupled to each other while the elastic member is disposed therebetween.

In order to prevent the wiper blade 20 from floating over the target of close contact due to wind, the cover member 22 may be in a form in which an A-shaped or A-shaped cross-section extends in the longitudinal direction. That is, the cross-section of the cover member 22 may be formed to be relatively symmetrical to the close contact member 21.

The cover member 22 may be provided with a material or structure that is more rigid than the close contact member 21, and the elastic member may be accommodated between the cover member 22 and the close contact member 21.

Because the elastic member, which is formed of a metal or the like, is surrounded by the cover member 22 and the close contact member 21, contact between moisture and the elastic member may be prevented, and generation of rust in the elastic member may be suppressed.

In order to finish both ends of the cover member 22 and the close contact member 21, a finishing cap (not denoted by a reference numeral) may be provided at both ends of the cover member 22 and the close contact member 21. However, the finishing cap may also be modified in various ways or omitted.

A coupling cover 23 for coupling with the wiper arm 10 is provided at a central portion of the cover member 22. The coupling cover 23 is a configuration that connects the wiper blade 20 to the adapter 30 so that the wiper blade 20 hinge-rotates about the adapter 30.

For example, in a coupling process, the coupling cover 23 and the adapter 30 may form a hinge shaft and a structure that rotates about the hinge shaft. Here, the coupling cover 23 may include a coupling hole 231 in order to form a rotating structure.

A catching protrusion 232 may be provided at an outer side of the coupling hole 231 and hold the hinge shaft, which is inserted into the coupling hole 231, so that the hinge shaft is not separated from the coupling hole 231. Of course, in a case in which the coupling hole 231 itself has an arc shape, which is a shape in the middle of a circular shape and a semi-circular shape, the hinge shaft forcibly fitted to the coupling hole 231 may not fall out of the coupling hole 231. Therefore, the catching protrusion 232 may be omitted according to the shape of the coupling hole 231.

The coupling cover 23 and the cover member 22 may be directly connected but may also be indirectly connected using a base member 24. The base member 24 may be fixed to the elastic member and engaged with the cover member 22 using various, non-limited methods (catching by a protrusion, forcible fitting, adhesion, etc.). When coupled to each other, the base member 24 and the elastic member may maintain a binding force that does not allow rotation or movement relative to each other.

The base member 24 may be provided at the cover member 22 or the like that is relatively deformable and may be provided with a material that allows stable coupling between the wiper blade 20 and the adapter 30. The base member 24, the cover member 22, and the like may be formed of synthetic resin, metal, or the like.

The base member 24 may be provided at a substantially central portion of the wiper blade 20 in the longitudinal direction and form a plane on which the coupling cover 23 is seated. In this case, the cover member 22, which has a cross-section that protrudes outward, may form a flat cross-section at a portion where the base member 24 is provided.

The base member 24 may surround left and right sides of the cover member 22 and the close contact member 21 and maintain a state in which the cover member 22 and the close contact member 21 are coupled to each other. Here, central portions of the cover member 22 and the close contact member 21 may be coupled by the base member 24, and both ends of the cover member 22 and the close contact member 21 may be coupled by a finishing cap.

The adapter 30 is used to couple the wiper blade 20 to the wiper arm 10. The adapter 30 may be firmly fixed to the arm part 11 via the fastening part 12 of the wiper arm 10, and movement of the adapter 30 and the arm part 11 relative to each other may not be allowed. On the other hand, the adapter 30 and the wiper blade 20 may be connected so that hinge rotation is allowed therebetween. The adapter 30 includes a main body part 31 and the locking part 32.

The main body part 31 of the adapter 30 is coupled to the wiper blade 20. Particularly, the main body part 31 may be coupled to the coupling cover 23 of the wiper blade 20.

The main body part 31 may include an outer surface 312 which faces the outer surface 122 of the fastening part 12, side surfaces 311 which face the side surfaces 121 of the fastening part 12, a front surface 313 which faces the locking part 32, and a rear surface 314 which is opposite the front surface 313. For reference, in this specification, "surface" does not necessarily refer to a flat surface and should be interpreted as a portion deformed in various ways, such as a depression, a protrusion, a step, a concave-convex portion, and a curved surface.

The guide parts **315*a* and 315*b* are provided at the side surfaces 311 of the main body part 31 that face the side surface 121 of the fastening part 12. The guide parts 315*a* and 315*b* are engaged with the coupling elements 1211*a*** and

1211*b*, which are disposed at the side surfaces 121 of the wiper arm 10, and allow the wiper arm 10 to be coupled to the adapter 30.

The guide parts 315*a* and 315*b* have insertion parts 3151*a* and 3151*b*, which are relatively recessed on the side surfaces 311 and extend substantially vertically, and catching part 3152*a* and 3152*b*, which extend substantially horizontally from distal ends of the insertion parts 3151*a* and 3151*b* (for example, inner side ends thereof facing the target of close contact). The insertion parts 3151*a* and 3151*b* may guide the coupling elements 1211*a* and 1211*b* to be inserted inward from the outer side and may be provided as grooves. That is, due to the presence of the guide parts 315*a* and 315*b*, the side surfaces 311 of the main body part 31 may form a concave-convex structure.

The insertion parts 3151*a* and 3151*b* may be provided to be vertical in a vertical direction. In this case, when the adapter 30 moves toward the wiper arm 10 in a state in which the coupling elements 1211*a* and 1211*b* of the wiper arm 10 are placed at outer sides of the insertion parts 3151*a* and 3151*b*, the coupling elements 1211*a* and 1211*b* move inward over the insertion parts 3151*a* and 3151*b*.

The coupling elements 1211*a* and 1211*b* that move to the innermost sides of the insertion parts 3151*a* and 3151*b* may move to the catching parts 3152*a* and 3152*b*. The catching parts 3152*a* and 3152*b* may be grooves that extend from the inner side ends of the insertion parts 3151*a* and 3151*b* in directions different from the insertion parts 3151*a* and 3151*b*. For example, unlike the insertion parts 3151*a* and 3151*b* which are vertical, the catching parts 3152*a* and 3152*b* may extend in a horizontal direction.

The insertion parts 3151*a* and 3151*b* and the catching parts 3152*a* and 3152*b* may be connected to form an L-shape. In this case, the coupling elements 1211*a* and 1211*b* of the fastening part 12 move inward along the insertion parts 3151*a* and 3151*b* while being seated on the insertion parts 3151*a* and 3151*b*, thereby facilitating close contact between the wiper arm 10 and the adapter 30. Then, the coupling elements 1211*a* and 1211*b* are seated on the catching parts 3152*a* and 3152*b* extending from the insertion parts 3151*a* and 3151*b*.

Here, the catching parts 3152*a* and 3152*b* may allow movement of the coupling elements 1211*a* and 1211*b* only in a second direction that is different from a first direction in which the coupling elements 1211*a* and 1211*b* are inserted into the insertion parts 3151*a* and 3151*b*. In this way, the catching parts 3152*a* and 3152*b* may block movement of the coupling elements 1211*a* and 1211*b* in the first direction. Here, the first direction refers to an inner side-outer side direction, which is a direction in which the wiper arm 10 is separated from the adapter 30.

Therefore, the insertion parts 3151*a* and 3151*b* allow the coupling elements 1211*a* and 1211*b* of the fastening part 12 to move from an outer side to an inner side such that the wiper arm 10 comes in close contact with the adapter 30, and the catching parts 3152*a* and 3152*b* suppress movement of the coupling elements 1211*a* and 1211*b* from the inner side to the outer side such that the adapter 30 is fixed to the wiper arm 10.

Of course, unlike in the drawings, the insertion parts 3151*a* and 3151*b* may be, instead of being vertical, provided in the form of a tilt line that is tilted at a predetermined angle with respect to the inner side-outer side direction. In this case, when the wiper arm 10 is being fitted to the adapter 30, the wiper arm 10 may move in up-down and front-rear directions.

The catching parts 3152*a* and 3152*b* may also be provided to be tilted instead of being provided in the horizontal direction that is parallel to the front-rear direction, thereby allowing the insertion parts 3151*a* and 3151*b* and the catching parts 3152*a* and 3152*b* to move in an L-shape, a V-shape, or the like that is tilted. Here, an angle between the insertion parts 3151*a* and 3152*b* and the catching parts 3152*a* and 3152*b* may be less than a right angle such that separation of the coupling elements 1211*a* and 1211*b* is suppressed.

Alternatively, in order to facilitate insertion of the coupling elements 1211*a* and 1211*b*, the insertion parts 3151*a* and 3151*b* may be formed such that a width of an inlet portion (an outer side end), through which the coupling elements 1211*a* and 1211*b* are inserted, is larger than a width of an inner side end connected to the catching parts 3152*a* and 3152*b*. That is, the insertion parts 3151*a* and 3151*b* may be V-shaped grooves formed in the side surfaces 311 of the main body part 31.

As described above, the plurality of coupling elements 1211*a* and 1211*b* may be provided at one side surface 121 of the fastening part 12. Therefore, the plurality of guide parts 315*a* and 315*b* of the main body part 31 may be provided to correspond to the coupling elements 1211*a* and 1211*b*.

However, taking into consideration that the coupling elements 1211*a* and 1211*b* provided at the side surface 121 of the fastening part 12 may be provided at different heights, the plurality of guide parts 315*a* and 315*b* may be provided in different shapes, which correspond to the coupling elements 1211*a* and 1211*b*, on the side surfaces 311 of the main body part 31.

For example, a first guide part 315*a* of the guide parts 315*a* and 315*b* is provided at a position corresponding to the first coupling element 1211*a*, and a second guide part 315*b* of the guide parts 315*a* and 315*b* is provided at a position corresponding to the second coupling element 1211*b*.

The guide parts 315*a* and 315*b* may basically include the insertion parts 3151*a* and 3151*b* and the catching parts 3152*a* and 3152*b*, but the shapes of the first guide part 315*a* and the second guide part 315*b* may be slightly different. For example, any one of the insertion part 3151*a* of the first guide part 315*a* and the insertion part 3151*b* of the second guide part 315*b* may be provided in a form in which the innermost side is closed, and the other one thereof may be provided in a form in which the innermost side is open.

In this case, insertion of the coupling elements 1211*a* and 1211*b* may be blocked by the innermost side of any one of the insertion part 3151*a* of the first guide part 315*a* and the insertion part 3151*b* of the second guide part 315*b*, and the catching parts 3152*a* and 3152*b* may extend from the insertion part 3151*a* of the first guide part 315*a* and the insertion part 3151*b* of the second guide part 315*b*, respectively, to correspond to the heights of the coupling elements 1211*a* and 1211*b* which are placed at positions where the insertion thereof is blocked.

The catching parts 3152*a* and 3152*b* of the first guide part 315*a* and the second guide part 315*b* may be provided at different heights corresponding to the arrangement of the coupling elements 1211*a* and 1211*b* which are provided at one side surface 121 of the fastening part 12. That is, the catching part 3152*a* of the first guide part 315*a* may be provided at a higher position than the catching part 3152*b* of the second guide part 315*b*.

In the main body part 31, a hinge part 316 is provided at one side (front side) of the guide parts 315*a* and 315*b*. The hinge part 316 may connect the locking part 32 to the main body part 31 and form a central axis about which the locking part 32 hinge-rotates with respect to the main body part 31.

The hinge part 316 extends forward from the front surface 313 of the main body part 31. In order to implement stable rotation of the locking part 32, the hinge part 316 may be provided as a pair of hinge parts 316 disposed at both sides of the front surface 313 of the main body part 31. Here, each hinge part 316 may be provided in the form of a free end that is deformable so that front ends of the hinge parts 316 are able to come close to each other by an external force. This is to rotate the locking part 32 so that the locking part 32 placed in the locking state reaches an unlocking state.

However, in order to maintain a gap between the pair of hinge parts 316, an elastic bar 316*a* configured to connect the hinge parts 316 may be provided. Keeping the pair of hinge parts 316 spaced apart from each other indicates that the locking state of the locking part 32 is maintained. This will be described in detail below.

A rotation limiting element 3161 protrudes from one side of the hinge part 316. The rotation limiting element 3161 may be provided as a protrusion. When the locking part 32 rotates about the hinge part 316, moves over the rotation limiting element 3161, and reaches the locking state, the rotation limiting element 3161 may limit rotation of the locking part 32 in the opposite direction and maintain the state in which the wiper arm 10 is fixed to the adapter 30.

The step part 317 may be provided at the outer surface 312 of the main body part 31 that faces the wiper arm 10. The step part 317 may have a stair-like shape and may be engaged with the above-described opening 1231 formed in the front surface 123 of the wiper arm 10.

That is, the step part 317 may be provided in a shape corresponding to the opening 1231 of the wiper arm 10, and when the wiper arm 10 is fastened to the adapter 30, the step part 317 is seated on the opening 1231 and the front surface 123 is coupled to surround the step part 317. Therefore, in addition to fixing the wiper arm 10 by catching between the coupling elements 1211*a* and 1211*b* and the guide parts 315*a* and 315*b*, movement of the wiper arm 10 may be restricted further.

Also, the front surface 123 of the wiper arm 10 that is seated on the step part 317 may have at least a portion formed as an inclined surface. As the inclined portion of the front surface 123 is pressed by the locking part 32, outward movement of the front surface 123 of the wiper arm 10 may be limited as described above.

The step part 317 may have a shape that is continuous with the insertion parts 3151*a* and 3151*b* of the first guide part 315*a*. Alternatively, a stepped structure configured to form the insertion parts 3151*a* and 3151*b* of the first guide part 315*a* may constitute the step part 317 at the side surface 311 of the main body part 31.

In order to reduce weight and reduce a load of the driving source for moving the wiper blade 20 while maintaining structural rigidity, the main body part 31 may have one or more grooves 3111 formed in the side surfaces 311. The grooves 3111 may be provided regardless of coupling with the wiper arm 10 or the wiper blade 20.

Alternatively, a hole 3121 may be formed in the outer surface 312 of the main body part 31. However, the groove 3111 or hole 3121 for reducing the weight of the adapter 30 may be applied in various ways other than those shown in the drawings of the present specification.

A seating part 318 may be provided at an inner side of the main body part 31. The seating part 318 is coupled to the wiper blade 20. The seating part 318 may be coupled to the coupling cover 23 of the wiper blade 20 and allow hinge-rotation between the wiper blade 20 and the main body part 31.

For example, referring to FIGS. 2 and 6, the coupling hole 231 may be provided in the coupling cover 23, and a seating element 3181, which is in the form of a bar that is insertable into the coupling hole 231, may be provided at the seating part 318.

Here, the coupling hole 231 may be in a cylindrical shape whose one side is open, and a catching protrusion 232 for preventing separation of the seating element 3181 may be provided. Because the seating element 3181 has a width that is larger than a width of one side of the coupling hole 231 that is open, the seating element 3181 may be fastened to the coupling hole 231 by being forcibly fitted thereto. The seating element 3181 fastened to the coupling hole 231 may serve as a hinge shaft so that the wiper arm 10 and the wiper blade 20 rotate relative to each other.

Therefore, both ends of the wiper blade 20 may be provided to be rotatable about the seating element 3181, and, in this way, the wiper blade 20 may effectively come in close contact with targets of close contact of various shapes.

To this end, the main body part 31 of the adapter 30 may have a shape in which the height of the side surface 311 decreases in the front-rear direction about the hinge shaft. That is, the lower end of the side surface 311 of the main body part 31 may be in the shape of a V-shaped curve or a U-shaped curve whose lowest point is the portion at which the seating element 3181 is provided. Here, a difference between a height of each of the front and rear ends of the side surface 311 and the maximum height of the side surface 311 at a substantially central portion thereof may determine an angle at which the adapter 30 rotates about the seating element 3181 as the hinge shaft.

The locking part 32 is rotatably provided in the main body part 31. The locking part 32 may be provided in a cap-like shape. Specifically, the locking part 32 has a pair of rotary surfaces 321 rotatably coupled to the hinge parts 316 and a cover surface 322 which extends between the rotary surfaces 321 and covers the outer surface 122 of the wiper arm 10 that surrounds the main body part 31.

The rotary surface 321 of the locking part 32 may be bound to be rotatable about the hinge part 316. For example, a protruding portion of the hinge part 316 may be inserted into the rotary surface 321 and serve as a center of rotation of the rotary surface 321.

The rotary surface 321 may be coupled to the hinge part 316 such that the hinge part 316 is exposed to the outside. This is because the pair of hinge parts 316 should be deformed to come close to each other in order to allow unlocking of the locking part 32. That is, the rotary surface 321 of the locking part 32 forms an exposed portion through which an external force may be applied to the hinge part 316.

A rear side end of the rotary surface 321 that faces the fastening part 12 of the wiper arm 10 may be provided to be inclined to correspond to the shape of the front surface 123 of the fastening part 12. Here, the rotary surface 321 may come in contact with or be very close to the front surface 123 of the fastening part 12 and suppress outward movement of the fastening part 12 while the locking part 32 is in the locking state.

A gap between the pair of rotary surfaces 321 may be smaller than the horizontal width of the fastening part 12. Therefore, the rotary surfaces 321 may be disposed to be seated on the front surface 123 of the fastening part 12.

A protruding element 3211 is provided at a surface of the rotary surface 321. The protruding element 3211 is a configuration that allows the user to grip the locking part 32 and easily rotate the locking part 32. Of course, instead of a single protruding structure, a structure that gives friction so that the user is able to grip the locking part 32 is also possible.

Rotation of the locking part 32 is limited by the rotation limiting element 3161 of the hinge part 316. When an external force acts so that the hinge parts 316 come close to each other, the rotation of the locking part 32 may be allowed. Therefore, the user may grip the locking part 32 using the protruding element 3211 and rotate the locking part 32 while pressing the portion of the hinge part 316, to which the rotary surface 321 is coupled, that is exposed to the outside.

The cover surface 322 connected to the rotary surface 321 covers the outer surface 122 of the fastening part 12 of the wiper arm 10 and prevents the wiper arm 10 from being separated outward. To this end, a cover element 3221 that extends toward the guide parts 315*a* and 315*b* may be provided at a rear end side of the cover surface 322.

When the locking part 32 is placed in the locking state, the cover element 3221 may be placed at a position at which it is projected on the outer surface 122 of the wiper arm 10 coupled to the adapter 30 and may interfere with outward movement of the wiper arm 10.

The cover element 3221 may be provided to cover at least the insertion parts 3151*a* and 3151*b* of the first guide part 315*a* in the locking state. This is in consideration of the fact that, since the coupling elements 1211*a* and 1211*b* of the wiper arm 10 are inserted into the first guide part 315*a*, the outer surface 122 of the wiper arm 10 covers at least outer sides of the insertion parts 3151*a* and 3151*b* of the first guide part 315*a*.

The cover surface 322 may cooperate with the rotation limiting element 3161 and allow or limit the rotation of the locking part 32. Specifically, when the locking part 32 rotates clockwise about the hinge part 316 in FIG. 6, a lower end of the cover surface 322 moves over the rotation limiting element 3161.

Here, as the rotation limiting element 3161 is placed below the cover surface 322, counterclockwise rotation of the locking part 32 is blocked by the rotation limiting element 3161. Therefore, this state is the locking state of the locking part 32.

On the other hand, when the pair of hinge parts 316 are deformed in a direction coming close to each other, positions of the rotation limiting elements 3161 may be slightly changed rearward in a direction deviating from the cover surface 322 while the rotation limiting elements 3161 come close to each other. Thus, the lower end of the cover surface 322 may become misaligned with the rotation limiting elements 3161.

Therefore, here, the locking part 32 may rotate counterclockwise, and the lower end of the cover surface 322 is disposed below the rotation limiting element 3161. In this state, the locking part 32 is in the unlocking state in which the outer surface 312 of the main body part 31 is exposed.

Hereinafter, a coupling method according to the present invention will be described in detail by referring back to FIG. 7.

Referring to FIG. 7, (1) first, when the locking part 32 is placed in the unlocking state, the fastening part 12 of the wiper arm 10 is seated on the main body part 31. Here, as the coupling elements 1211*a* and 1211*b* of the fastening part 12 slide along the insertion parts 3151*a* and 3151*b* provided in the guide parts 315*a* and 315*b* of the main body part 31, the wiper arm 10 moves inward in a direction coming in close contact with the main body part 31.

(2) Then, when the wiper arm 10 slides in the horizontal direction based on the drawing, the coupling elements 1211*a* and 1211*b* of the wiper arm 10 deviate from the insertion parts 3151*a* and 3151*b* and are inserted into the catching parts 3152*a* and 3152*b* extending from the insertion parts 3151*a* and 3151*b*. Therefore, since outward movement of the coupling elements 1211*a* and 1211*b* is blocked due to the catching parts 3152*a* and 3152*b*, the wiper arm 10 may be fastened to the main body part 31.

(3) Then, when the locking part 32 rotates clockwise, the cover element 3221 of the cover surface 322 covers at least a portion of the outer surface 122 of the fastening part 12 of the wiper arm 10 that is coupled to the main body part 31. Also, the rotary surface 321 faces the front surface 123 of the fastening part 12 of the wiper arm 10.

Here, as the cover surface 322 moves over the rotation limiting element 3161 and then a front end side of the cover surface 322 is seated on the rotation limiting element 3161, rotation of the locking part 32 may be limited in a counterclockwise direction.

Hereinafter, the coupling method according to the present invention will be described again by referring back to FIGS. 8A to 8C.

Referring to FIG. 8, (A) as the pair of hinge parts 316 are pressed by an external force in a direction coming close to each other, the locking part 32 is rotated counterclockwise by a hand or the like of a user gripping the locking part 32 using the protruding element 3211 of the rotary surface 321, and the locking part 32 reaches the unlocking state in which the main body part 31 is not covered by the locking part 32. In this way, separation of the wiper arm 10, which has been fastened, may be possible.

Here, as the front end side of the cover surface 322 comes in contact with the inner side end of the hinge part 316, the locking part 32 may be rotatable up to an angle at which the entire inner side surface of the cover surface 322 is exposed to the outside.

(B) Then, the coupling elements 1211*a* and 1211*b* of the wiper arm 10 are inserted along the insertion parts 3151*a* and 3151*b* of the guide parts 315*a* and 315*b* provided in the main body part 31 and are seated on the catching parts 3152*a* and 3152*b* extending from the insertion parts 3151*a* and 3151*b*. This is the same as in the above descriptions (A) and (B) with reference to FIG. 7.

Here, movement of the wiper arm 10 may be determined according to the shape (for example, L-shape) of the guide parts 315*a* and 315*b* having the insertion parts 3151*a* and 3151*b* and the catching parts 3152*a* and 3152*b*. In a case in which the shape of the guide parts 315*a* and 315*b* changes as described above, the movement of the wiper arm 10 fastened to the adapter 30 may also change.

(C) Then, by rotating the locking part 32 so that the cover element 3221 covers the outer surface 122 of the wiper arm 10 as in the above description (3) with reference to FIG. 7, fastening the wiper arm 10 is completed.

By such operations, the wiper arm 10 may be suppressed from being separated outward by a combination of various factors, e.g., a coupling elements 1211*a* and 1211*b* being seated on the catching parts 3152*a* and 3152*b*, the rotary surface 321 of the locking part 32 being inclined to face the front surface 123 of the wiper arm 10, and the cover element 3221 of the locking part 32 covering the outer surface 122 of the fastening part 12.

As described above, the embodiments relate to an idea of assembling the wiper apparatus 1 by connecting the wiper arm 10 and the wiper blade 20. In order to fix the wiper arm 10 having at least four coupling elements 1211*a* and 1211*b*, the guide parts 315*a* and 315*b* corresponding to the wiper arm 10 may be provided, and the adapter 30 including the locking part 32 may be used. In this way, it is possible to implement firm fastening of the wiper arm 10 to the wiper blade 20.

A wiper blade assembling adapter, a wiper blade assembly, and a wiper apparatus according to the present invention utilize a locking part that, by rotating, opens an upper side of a body part when a wiper is separated and covers the upper side of the body part and prevents separation of the wiper when the wiper is fixed, thereby facilitating replacement of the wiper and allowing firm fastening between a wiper blade and a wiper arm.

The present invention has been described above in detail using specific embodiments thereof. However, the embodiments are merely for describing the present invention in detail, and the present invention is not limited to the embodiments. It should be apparent that the present invention may be changed or modified by those of ordinary skill in the art within the technical idea of the present invention.

Any simple modification or change of the present invention falls within the scope of the present invention. The specific scope of the present invention should become apparent by the attached claims.

What is claimed is:

1. A wiper blade assembling adapter for coupling a wiper blade to a wiper arm, which has a distal end at which a plurality of coupling elements facing each other protrude inward from each side surface surrounding the adapter, the wiper blade assembling adapter comprising:

a main body part coupled to the wiper blade; and a locking part rotatably provided in the main body part, wherein the main body part includes a plurality of guide parts including a first guide part and a second guide part, each having a) an insertion part into which a coupling element of the plurality of coupling elements of the wiper arm is inserted in a first direction and b) a catching part which extends from a distal end of the insertion part in a second direction different from the first direction and which is configured to block movement of the coupling element in the first direction after the coupling element moves in the second direction, the main body part having a hinge part disposed at one side of the main body part, and the locking part has a) a rotary surface which is rotatably coupled to the hinge part and b) a cover surface which extends from the rotary surface and covers an outer surface of the wiper arm that surrounds the main body part, and wherein the cover surface has a cover element that extends from a distal end toward the guide part, and the cover element covers at least the insertion part of the first guide part in a locking state.

2. The wiper blade assembling adapter of claim 1, wherein:

the plurality of coupling elements of the wiper arm protrude inward at different heights; and the plurality of guide parts are provided such that heights of the catching parts are different.

3. The wiper blade assembling adapter of claim 1, wherein the insertion part and the catching part are connected to form an L-shape.

4. The wiper blade assembling adapter of claim 1, wherein the first guide part is disposed adjacent to the hinge part and the second guide part is disposed farther removed from the hinge part than the first guide part.

5. The wiper blade assembling adapter of claim 4, wherein the main body part further includes a step part provided at an outer surface facing the wiper arm.

6. The wiper blade assembling adapter of claim 5, wherein the step part has a shape that is continuous with the insertion part of the first guide part.

7. The wiper blade assembling adapter of claim 4, wherein a rotation limiting element protrudes from one side of the hinge part, and the locking part changes between an unlocking state, in which the cover surface rotates to cause an outer surface of the main body part to be exposed, and a locking state, in which the rotary surface rotates to cover the outer surface of the main body part.

8. The wiper blade assembling adapter of claim 1, wherein the hinge part is provided as a pair of hinge parts at both sides of one surface of the main body part, each hinge part is provided in the form of a free end that is deformable so that distal ends of the hinge parts are able to come close to each other, and an elastic bar configured to connect the pair of hinge parts to each other is provided to maintain a gap between the hinge parts.

9. A wiper blade assembly comprising:

a wiper blade which has a close contact member configured to come in close contact with a surface of a target of close contact; and an adapter which is fastened to the wiper blade and to and from which a wiper arm is attached and detached, wherein the adapter includes a main body part coupled to the wiper blade and a locking part rotatably provided in the main body part, the main body part includes a) an insertion part into which a coupling element, which protrudes from a side surface of the wiper arm that surrounds a side surface of the main body part, is inserted and b) a catching part configured to catch the coupling element seated thereon after passing through the insertion part, and the locking part has a) a rotary surface which is rotatably connected to the main body part and b) a cover surface which covers an outer surface of the wiper arm that covers an outer surface of the main body part, and wherein the cover surface has a cover element that extends from a distal end toward the guide part, and the cover element covers at least the insertion part of the first guide part in a locking state.

10. The wiper blade assembly of claim 9, wherein the wiper blade further includes an elastic member configured to provide an elastic force to the close contact member in a direction in which close contact with the close contact member occurs, and a cover member configured to cover the elastic member.

11. The wiper blade assembly of claim 9, wherein the wiper blade further includes a coupling cover provided at a center and to which the adapter is coupled, wherein a coupling hole in a cylindrical shape whose one side is open is provided in any one of the main body part and the coupling cover, and a bar-shaped seating element configured to be forcibly fitted to the coupling hole is provided at the other one of the main body part and the coupling cover.

12. The wiper blade assembly of claim 11, wherein the seating element is fastened to the coupling hole and serves as a hinge shaft so that the wiper arm and the wiper blade rotate relative to each other.

* * * * *